United States Patent [19]

Piotrowski

[11] Patent Number: 4,512,068
[45] Date of Patent: Apr. 23, 1985

[54] PALLET RECEIVER WITH COMPLIANT PIN AND SOCKET REGISTRATION

[75] Inventor: Tadeusz W. Piotrowski, Cincinnati, Ohio

[73] Assignee: Cincinnati Milacron Inc., Cincinnati, Ohio

[21] Appl. No.: 178,922

[22] Filed: Aug. 23, 1982

[51] Int. Cl.³ .......................... B23Q 1/28; B23Q 7/14; B23Q 41/02
[52] U.S. Cl. ...................... 29/33 P; 29/1 A; 29/563; 198/345; 408/70; 267/158; 409/174; 409/241
[58] Field of Search .............. 29/1 A, 33 P, 563, 33 J; 269/69; 408/70, 71, 44, 45; 198/345; 267/158; 409/158, 159, 161, 172, 173, 174, 241

[56] References Cited

U.S. PATENT DOCUMENTS 2,953,069  9/1960  Smith ........................... 29/33 J X
3,054,333  9/1962  Brainard et al. ............... 29/33 P X
3,209,623 10/1965  Schardt ........................... 269/69

Primary Examiner—Z. R. Bilinsky
Attorney, Agent, or Firm—Thomas M. Farrell

[57] ABSTRACT

A pallet receiver for a machine tool is disclosed utilizing a pin and socket for registration and alignment. A pallet clamp piston is employed to clamp the pallet to the receiver base for subsequent machining operations. A registration pin is rigidly secured to the receiver base, and a cooperating pin socket is mounted to the pallet underface by means of a compliant diaphragm spring so that as the socket and pin are engaged during the first portion of clamp piston movement the pallet will be registered and aligned with respect to the receiver base, and during the second and final portion of piston movement the axially compliant pin socket will permit the pallet to engage a rigid clamp down surface on the receiver base, thus insuring a positive final resting position for the pallet on the receiver base.

3 Claims, 6 Drawing Figures

PALLET RECEIVER WITH COMPLIANT PIN AND SOCKET REGISTRATION

BACKGROUND OF THE INVENTION

The invention generally relates to machine tools, and in particular, to machine tools employing interchangeable pallets which are fixtured or registered on a pallet receiver base adjacent to the main machine base.

The interchange of pallets on a machine tool is well developed art, wherein pallets having a common machine registration surface may be employed to adapt workpieces to the machine. By the use of common pallets, a first workpiece may therefore be operated upon by a machine cutter while a second workpiece may be fixtured at a remote position from the machine to a pallet for subsequent interchange with a finished workpiece. The interchange of workpiece pallets may be automatic by pallet interchangers or may be manual, carried out by an operator.

Final registration and location of the pallet with respect to the machine tool is of critical importance, and a variety of pallet locators have been employed in the prior art. One prior assembly utilized in U.S. Pat. No. 3,054,333 consists of a plurality of conical locating pins on a receiver base and a like plurality of mating conical sockets on the underface of a pallet, wherein a pallet is clamped down socket-to-pin by a clamp piston. The analogy may be made between the reference patent and other similar types of "shot pin" locators which inject a conical tapered pin into a cooperating socket to locate one member with respect to another. The problem inherent in utilizing such a mechanism for final registration of a pallet on a receiver base is that it is difficult to align the pins and sockets to level the pallet in a horizontal plane, and to locate the pins and sockets so they will not tend to fight one another for radial location with respect to the pin. Additionally, it can be appeciated that as inevitable wear occurs, in one or more pin-socket sets, the pallet will be tilted with respect to the horizontal plane and will tend to lose its alignment of the vertical stack of receiver base, pallet, and workpiece.

A second prior art pallet registration apparatus is disclosed in U.S. Pat. No. 3,543,392 in which the receiver base and the pallet underface are each fitted with one-half of a multitooth facial coupling each having a plurality of conforming teeth. The separable coupling halves tend to minimize and distribute wear around the coupling teeth which tends to maintain the accuracy of the stack height and level attitude of the pallet with respect to the machine tool, but the facial array is expensive to produce and it is difficult to produce pallet coupling halves which mate equally alike wih the receiver base coupling half.

Applicant has obviated the difficulties inherent in these types of prior art devices by a unique mechanism employing a pin and socket combination for alignment while utilizing stiff, rigid bearing surfaces for ultimate clamping and location of the pallet with respect to the receiver base.

It is therefore an object of the present invention to provide a pallet registration mechanism capable of accurately aligning a pallet with respect to a receiver base, yet providing a stiff location surface to withstand machining forces.

Another object of the present invention is to provide a pin and socket registration means capable of compensating for wear at the pin and socket interface.

A still further object of the present invention is to provide a pallet registration means capable of distributing wear over a large surface in the clamped stack of registration base, pallet, and workpiece, to maintain overall stack height accuracy.

SUMMARY OF THE INVENTION

The invention is shown embodied in a machine tool utilizing a pallet interchanger; a pallet receiver adapted to receive common pallets from the interchanger; and means to clamp and release the pallet at the receiver at interchange times, comprising a first rigid locating surface on the receiver base in the form of wear pads or alternately wear bars, and a second cooperating rigid locating surface is provided on the pallet for engaging the first locating surface when the pallet is clamped down. A registration socket is provided in the pallet and mounted thereto by a diaphragm spring which provides a compliant mounting means to support the socket. A registration pin is rigidly located on the pallet receiver and has a conical tip. The pin socket is provided with a mating conical tip recess to engage the pin when the pallet is clamped down. Thus, during a first portion of the clamp down movement the pallet socket engages the pin tip, and during the second portion of the continuous clamp down stroke the pallet socket will deflect under the compliant diaphragm spring to permit engagement of the rigid locating surfaces of the pallet with the receiver base, insuring accurate alignment about the rigid registration pin and rigid clamping of the pallet on the locating surfaces to withstand the machining forces. Any wear of the pin tip or mating socket is compensated for by the deflectable diaphragm support which carries the socket.

DESCRIPTION OF THE PREFERRED EMBODIMENT

Figure 1:
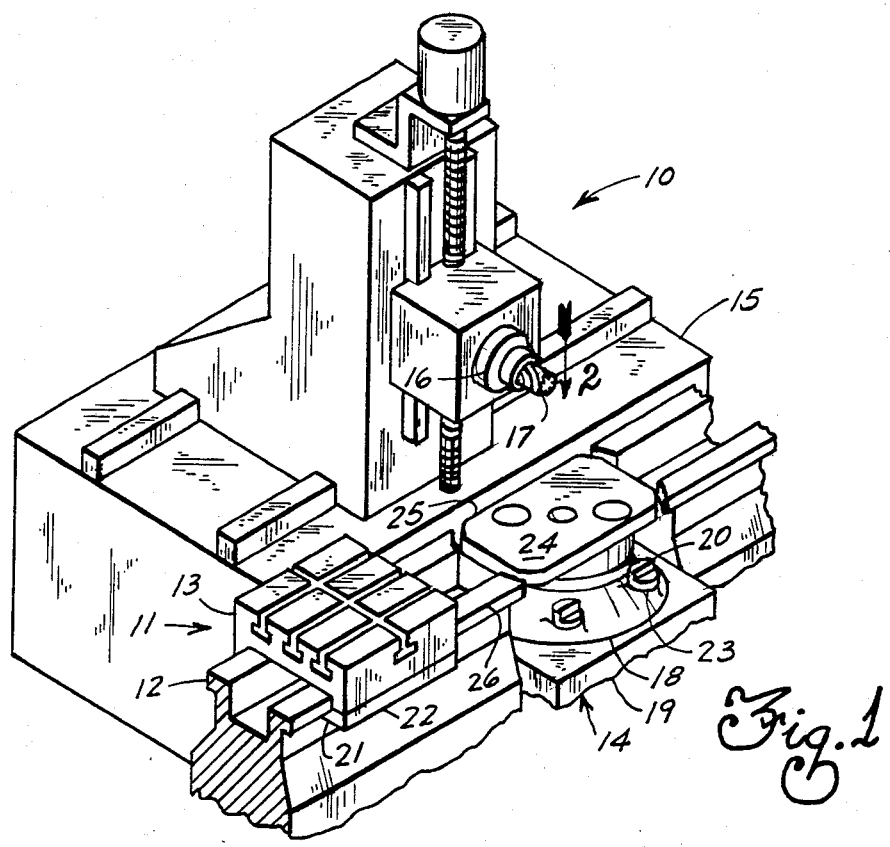
FIG. 1 is a perspective view of a machine tool employing the invention.

FIG. 1 of the drawings shows a machine tool 10 having a pallet interchange device 11 comprising a linear slideway 12 with transport mechanism (not shown) for slidably presenting a pallet 13 to a pallet receiver 14 located in close proximity to the machine tool base 15. The pallet interchange device could, alternatively, be a rotary mechanism or could be substituted for by a purely manual function. The machine tool base 15 carries a cutter spindle 16 and cutter 17 capable of providing a variety of machine tool operations to be performed on a workpiece (not shown). Workpieces are secured off the machine to a variety of common pallets 13, which are selectably interchanged with the pallet receiver 14. The pallet receiver 14 has a receiver base 18 against which the pallet 13 is clamped and stationarily held with respect thereto during machining operation. Here it may be noted that the receiver base 18 is shown circular and rotatable by a drive mechanism (not shown) with respect to a receiver subbase 19 which is stationary with respect to the machine base 15. However, the receiver base 18 need not be rotatable and such rotation capability does not form part of the invention. The receiver base 18 is provided with a plurality of locating wear pins 20 against which the bottommost edge 21 of the pallet clamp lip 22 is clamped during machining operations. While the wear pins 20 are shown separate from one another, it may be appreciated that a pair of pins 20 such as shown in FIG. 1 may be substituted for by a longitudinal wear strip having a similar cross-section and extending across the two pin bosses 23 parallel to the receiver slide 24. The receiver slide 24 is, of course, parallel to the interchange slide 12 and is movable from a topmost position (shown) where the top surface 25 of the receiver slide 24 is level with the top surface 26 of the interchange slide 12 for receiving an oncoming pallet 13, and the receiver slide 24 is thereafter movable in a vertical direction to clamp the pallet clamp lip 22 down against the wear pins 20 of the receiver base 18. The up-down mechanism will be described further in conjunction with the section view of FIG. 3.

Figure 2:
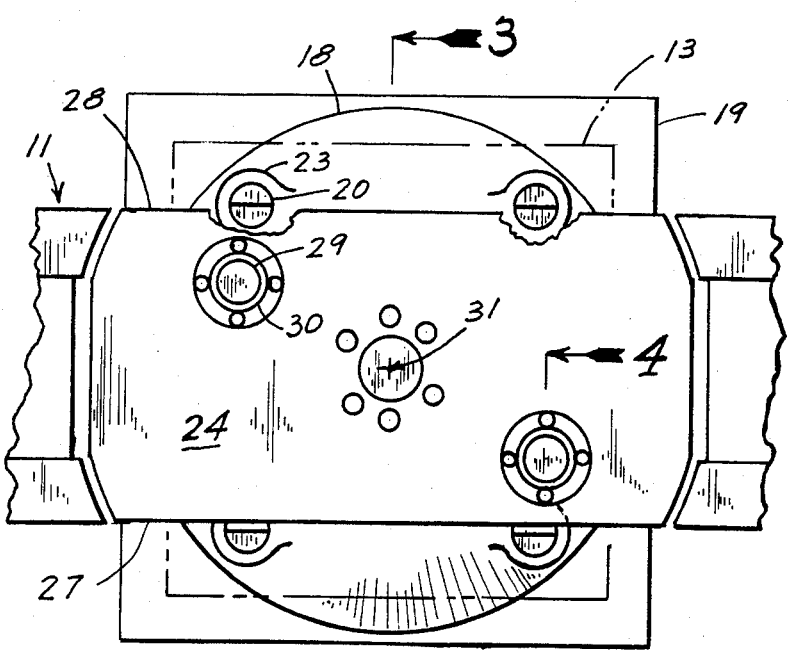
FIG. 2 is a plan view of the pallet receiver of FIG. 1 taken in the direction of arrow 2 of FIG. 1.

The plan view of FIG. 2 illustrates the receiver base 18 having a plurality of bosses 23 provided thereon which are machined and fitted with wear pins 20 to support a clamped pallet 13. The side edges 27,28 of the receiver slide 24 are parallel and of equal width to the interchange slide 12 so that a moving pallet 13 is insured continuity of slide ways. A pair of locating pins 29 are provided in the receiver base 18 which extend through seals 30 located in the receiver slide 24 and the locating pins 29 are oppositely disposed about the central vertical axis 31 of the receiver slide 24.

Figure 3:
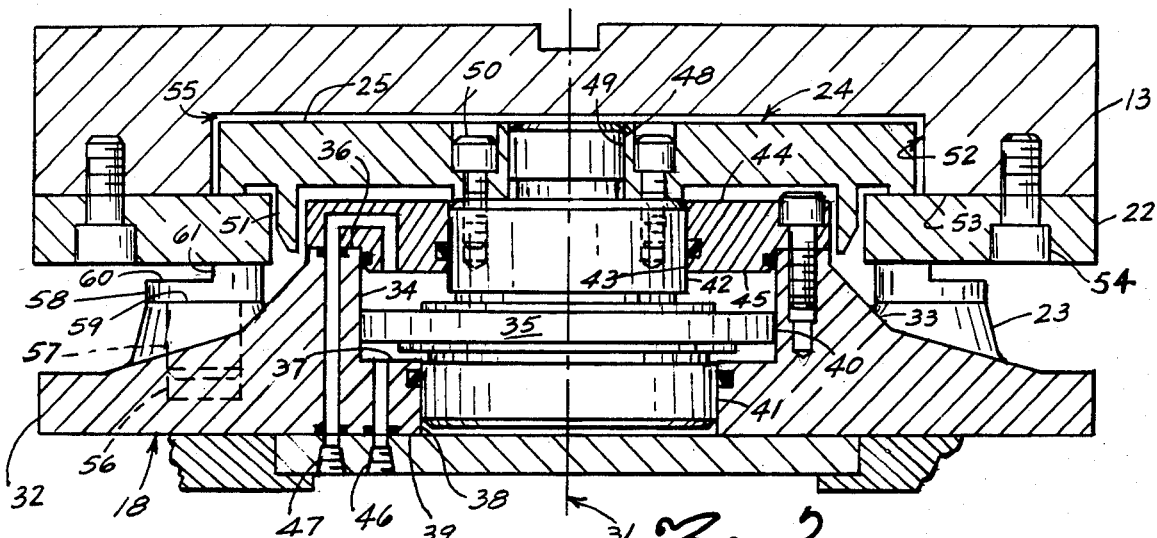
FIG. 3 is an elevational section taken through the pallet receiver taken along the line 3—3 of FIG. 2.

The section of FIG. 3 taken through the vertical axis 31 of the receiver base 18 illustrates that the base 18 is generally comprised of a circular flanged bottom section 32 which blends to a main central portion 33 which is likewise circular. The central portion 33 has a piston bore 34 forming a cylinder for a close-fitting piston 35, wherein the bore 34 extends from the top surface 36 of the base 18 to a bottom surface 37 forming a shoulder within the piston bore 34. A second bore 38 is machined through the receiver base 18 from the bottommost surface 39 to the bottom surface 37 of the piston bore 34, to pilot the piston 35 received therein. The piston 35 has a central piston diameter 40 fitted to the piston bore 34, and has oppositely extending end pilot diameters 41,42 extending respectively down through the second bore 38 and upward through a third bore 43 formed through a cylinder cap 44 which is received on the topmost surface 36 of the receiver base 18. The cylinder cap 44 serves to encapsulate and limit upward movement of the piston 35 which is stopped against a pilot portion 45 formed on the cap 44 and extending into the piston bore 34. Suitable hydraulic ports 46,47 are formed in the receiver base 18 and cylinder end cap 44 to provide porting of hydraulic fluid to raise and lower the piston 35. The upper pilot diameter 42 of the piston 35 has a still smaller reduced end pilot diameter 48 extending therefrom upon which is received the bore 49 of the receiver slide 24. The receiver slide 24 is a generally rectangular plate about the central bore 49, and screws 50 are provided to secure the slide 24 to the piston 35.

An annular skirt 51 is provided on the receiver slide 24 which extends down around the cylinder end cap 44 to act as a dust seal. As shown in FIG. 3, the pallet 13 is generally rectangular in cross-section having a slide recess 52 formed in its bottom surface 53, and a pair of clamp lips 22 are secured to the bottom surface 53 of the pallet 13 by screws 54, so that once slid into position on the receiver slide 24, the pallet 13 will be movable with the slide 24 in up or down directions. The clamp lips 22 extend along the bottom surface 53 of the receiver slide 24, and a slight clearance 55 exists between the top surface 25 of the slide 24 and the slide recess 52 in the pallet 13. The receiver base 18 has a plurality of bosses 23 formed thereon, equally disposed about the central axis 31, and the bosses 23 have a suitable co-bore 56 machined therein to receive a pilot diameter 57 of a pallet-locating wear pin 20. The pallet-locating wear pin 20 has a head 58 seated on the top surface 59 of the receiver base boss 23, and the cylindrical head 58 of the pin 20 is relieved for a portion 60 so that only the portion 61 of the head 58 immediately under the receiver slide 24 will contact the clamp lip 22 of the pallet 13. The drawing FIG. 3 shows the piston 35 in the downmost, clamped position, wherein the receiver slide 24 is likewise forced to its downmost position, entrapping the clamp lip 22 of the pallet 13 against the wear pin 20.

Figure 4:
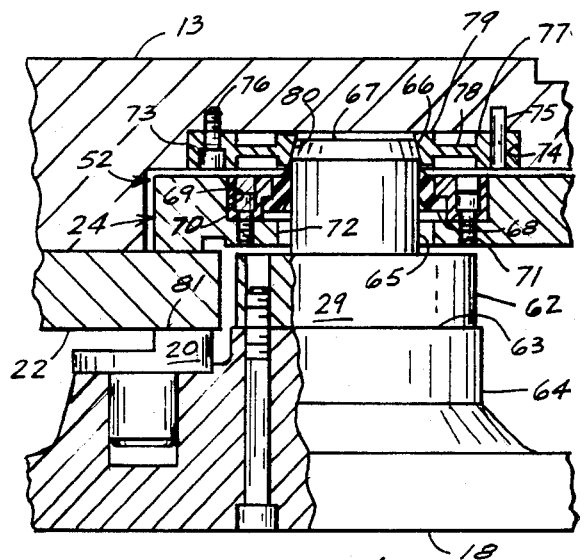
FIG. 4 is a section taken along the line 4—4 of FIG. 2.

The section of FIG. 4, taken through the locating pin 29 of FIG. 2, illustrates that the locating pin 29 has a cylindrical flange 62 which is positioned against the top surface 63 of the special boss 64 provided on the receiver base 18, and the pin 29 has a main cylindrical portion 65 extending from the flange 62 and blending to a conical taper 66 at the end 67 of the pin 29. The main cylindrical portion 65 of the pin 29 extends through an elastomeric seal 68 which is secured in a counterbore 69 provided in the receiver slide by a seal retainer 70 and screws 71. The counterbore 69 is concentric with a clearance bore 72 provided in the receiver slide 24 through which passes the locating pin 29. The pallet 13 has a socket member 73 located in a counterbore 74 provided in its slide recess 52 and secured by pins 75 and screws 76. The socket member 73 has a thick cylindrical rim 77 which is thinned down to a central cylindrical web 78, which forms a diaphragm spring, relatively stiff in radial directions relative to the rim 77, yet axially movable and compliant with respect to the rim 77. The web 78 terminates at an interior socket portion 79, which has machined therein, a conical socket 80 which corresponds to the conical taper 66 of the locating pin 29. Thus, it may be seen that when the pallet 13 is clamped in the downward direction by the pull of the receiver slide 24 against the clamp lip 22, the socket 80 will engage the locating pin 29 and establish accurate alignment of the pallet 13 about the pin 29 in radial directions. In the view shown, the diaphragm web 78 is slightly stressed, though the defection is imperceptible and generally has an available range in the nature of several thousandths of an inch although only a portion is used. This is so that final vertical location of the pallet is established and maintained by the contact of the clamp lip 22 on the rigid locating surface 81 of the wear pin 20 and not dependent on the vertical positioning of the socket 80 on the pin 29. By this manner, the total stack height of the assembly, that is, the receiver base, pallet, and workpiece (not shown) may be maintained with respect to the machine tool. The downward clamp stroke of the piston 35 of FIG. 3, accomplishes the engagement of the socket 80 and pin 29 in a first portion of the downward stroke, and subsequently, the compliant pin socket 80 will permit the pallet 13 to be clamped down on the rigid wear pins 20 of the receiver base 18 during the final portion of the piston stroke.

Figure 5:
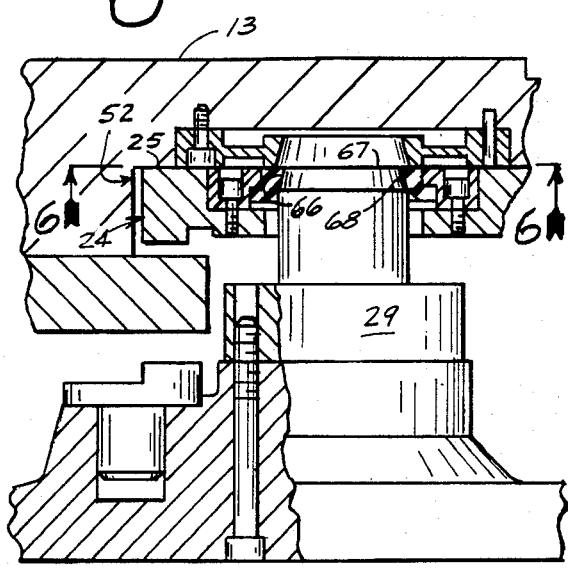
FIG. 5 is an alternate view of the elements of FIG. 4 shown in the unclamped position.

FIG. 5 illustrates the elements of FIG. 4 in the upmost position, wherein the top surface 25 of the receiver slide 24 is bearing against the slide recess 52 in the pallet 13, and the receiver surface 25 is aligned with the top end 67 of the locating pin 29. It can be seen, therefore, that the elastomeric seal 68 of the receiver slide 24 will tend to hug the conical taper 66 of the pin 29 during the upward stroke, and the elastomeric seal 68 thus provides a closure about the end 67 of the pin 29 to prevent entry of contaminants to the critical locating taper 66 during pallet interchanges, when the top 67 of the pin 29 is exposed.

Figure 6:
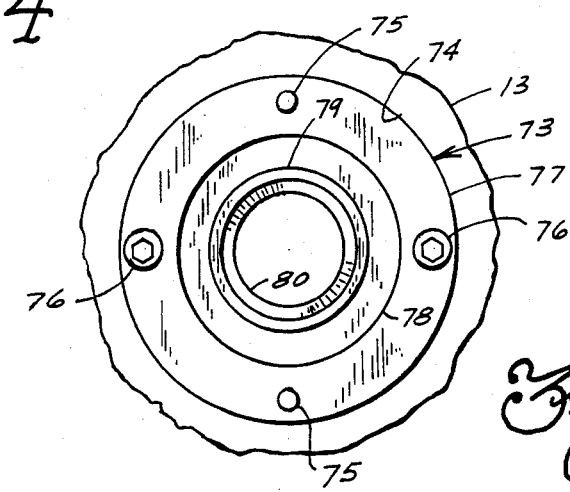
FIG. 6 is a view of the socket of FIG. 5 taken along the line 6—6 of FIG. 5.

The view of FIG. 6 shows the socket member 73 and its respective cylindrical elements 77,78,79,80 wherein the member 73 is secured in the pallet counterbore 74 by pins 75 and screws 76.

As previously stated in the description of FIG. 1, the pair of wear pins 20 lying along a common side of the receiver slide 24 may be substituted for by a longitudinal bar having a cross section as shown by the profile of the pinhead 58 of FIG. 3 to provide a greater surface for wear distribution during the life of the pallet receiver 14.

It is not intended that the invention be limited to the specific embodiment shown herein, but rather the invention extends to all such designs and modifications as come within the scope of the appended claims.

What is claimed is:

1. An improved pallet registration apparatus in a machine tool having: a pallet interchanger; a pallet receiver with a base adapted to receive a pallet from said interchanger; and means to clamp and release said pallet at said receiver at selected interchange times, wherein the improvement comprises:
   (a) a first rigid locating surface on said receiver base;
   (b) a second rigid locating surface on said pallet;
   (c) a registration socket located on one of said pallet and receiver;
   (d) a registration pin matingly-shaped to said socket, located on the other of said pallet and receiver; and
   (e) diaphragm spring mounting means supporting one of said pin and said socket; wherein said pallet is moved and aligned through engagement of said pin and socket during a first portion of clamp means movement, and is subsequently stationarily held and clamped through engagement of said first and second rigid surfaces during a second portion of clamp means movement.

2. The apparatus of claim 1 wherein said pin has a conical tip and said socket has a conical bore.

3. The apparatus of claim 2 wherein said first and second locating surfaces are flat.

* * * * *